United States Patent
Girard et al.

(10) Patent No.: US 6,267,680 B1
(45) Date of Patent: Jul. 31, 2001

(54) DEVICE FOR CONNECTING, TO AN EXTERNAL PART, AN INNER ARMATURE CORE OF A FLEXIBLE JOINT

(75) Inventors: André Girard, Mehun sur Yevre; Jean-Claude Labbe, Foecy; Jean-François Leroy, Vierzon, all of (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/253,601

(22) Filed: Feb. 22, 1999

(30) Foreign Application Priority Data

Feb. 24, 1998  (FR) .................................................. 98 02189

(51) Int. Cl.⁷ ....................................................... F16D 3/52
(52) U.S. Cl. ............................................. 464/89; 464/52
(58) Field of Search .................. 464/89, 52; 267/140.12, 267/141.2, 150, 293; 403/365, 366, 367, 368, 370; 248/300, 610

(56) References Cited

U.S. PATENT DOCUMENTS

| 1,779,663 | 10/1930 | Cowell . | |
|---|---|---|---|
| 1,783,801 | 12/1930 | Leipert . | |
| 3,140,081 | * 7/1964 | Peterson | ................................. 464/89 |
| 3,722,843 | * 3/1973 | Enckler | ................................. 248/300 |
| 4,051,905 | * 10/1977 | Kleine | ................................. 464/89 |
| 4,078,276 | 3/1978 | Nunes . | |
| 4,329,826 | * 5/1982 | Flogaus et al. | ........................ 52/712 |
| 4,854,561 | * 8/1989 | Kanda | .............................. 267/140.12 |
| 5,024,425 | * 6/1991 | Schwerdt | ........................ 267/140.12 |
| 5,680,733 | * 10/1997 | Mitani | ................................. 248/300 |

FOREIGN PATENT DOCUMENTS

| 1 054 849 | 9/1953 | (DE) . |
|---|---|---|
| 81 29 047 | 4/1982 | (DE) . |
| 2 675 231 | 11/1991 | (FR) . |

OTHER PUBLICATIONS

French Preliminary Search Report dated Nov. 16, 1998, Int'l. Appl. No. FR 9802189.

* cited by examiner

Primary Examiner—Lynne H. Browne
Assistant Examiner—Aaron M Dunwoody
(74) Attorney, Agent, or Firm—Marshall, O'Toole, Gerstein, Murray & Borun

(57) ABSTRACT

The connection between the core 12 of the flexible joint and the external part concerned is provided by two strips mounted head to foot in a through rectangular opening in the core, on the ends of which the strips abut by their widened head 18. The body 17 of the strips, engaged completely in the rectangular opening, is slightly wider than the terminal part 19 of the strips, narrower to facilitate their assembly. The fixing holes, one in the head 18, the other (22) in the terminal part 19, lie one over the other but are of slightly different diameters.

5 Claims, 3 Drawing Sheets

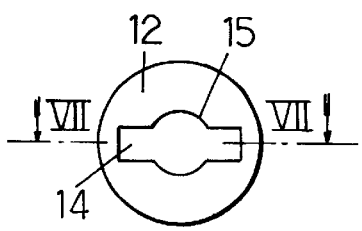
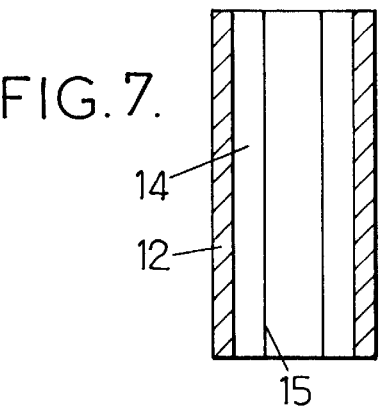
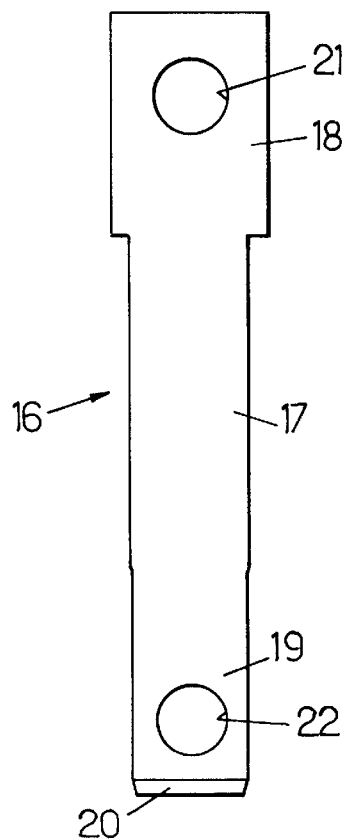
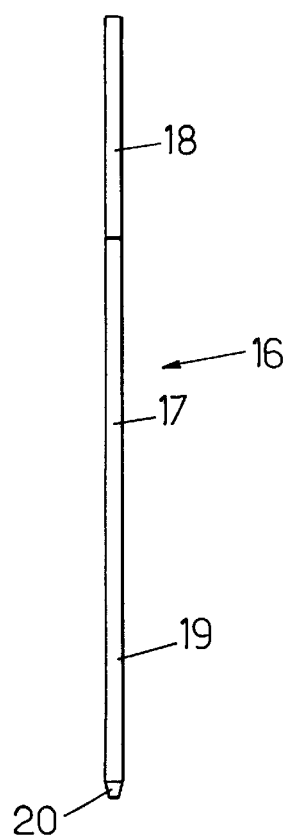

DEVICE FOR CONNECTING, TO AN EXTERNAL PART, AN INNER ARMATURE CORE OF A FLEXIBLE JOINT

FIELD OF THE INVENTION

The present invention concerns a device for connecting, to an external part, an inner armature core of a flexible joint, this core being moreover connected to an outer armature by a mass of flexible material.

It could be, for example, in the motor vehicle area, a flexible joint device for connecting a front suspension arm to the vehicle sub-frame.

BACKGROUND OF THE INVENTION

In FIGS. 1 to 3 of the drawings here appended, different known devices are shown in axial cross section, along the joint axis. In these figures, the joint device D is intended to provide the flexible connection between an arm T and a sub-frame B of the vehicle (or a part which is integral with it), the arm and sub-frame being only partially shown.

In FIG. 1, the outer armature 1 of the joint device D is mounted with a tight fit in a corresponding housing of the arm T, the device including, as inner armature 2, a tube passed through by a bolt 3 the end nut 4 of which enables the sub-frame to be clamped between the branches of a clevis 5, an elastomer sleeve 6 being bonded between the two armatures.

In FIG. 2, wherein the same references denote the same parts, the outer armature 1 is mounted with a tight fit, in the same way as in FIG. 1, in a housing of the sub-frame B; a spindle 7 of the arm T is cantilevered, tightly fitting in the bore 8 of the tube 2.

In FIG. 3, the outer armature 1 is again mounted with a tight fit in a corresponding housing of the arm T, and the outer armature 2 is constituted by a tube the ends of which, being external to the sleeve 6, are crushed and drilled with holes enabling them to be fixed on the sub-frame by means of studs 9 and nuts 10.

When the inner armature 2 is made by cold forming and machining, the manufacture is expensive and the moulding of the elastomer sleeve is more complex.

When the inner armature 2 is made from a tube the ends of which are crushed and punched after the rubber has been moulded, the choice of inner tube diameter and thickness is restricted.

SUMMARY OF THE INVENTION

The object of the present invention is to overcome these various drawbacks of the prior art, and to ensure that, for ease of manufacture, the fixing means of the inner armature (holes or the like) can be constituted on different parts of this armature, adjustable on this latter.

To this end, a device of the general type defined at the beginning is, in accordance with the present invention, characterised in that the said core is constituted by a thick tube comprising centrally a through, rectangular and narrow opening, and in that the said device comprises two connection strips each having:

a body of constant width able to engage with a tight fit, along this width, in the said opening in the core, along the long side of the rectangular section of this opening;

an end head approximately wider than the said body and able to rest against the corresponding end of the said core when the body is engaged in the said rectangular opening in this core, the said strip then protruding at its other end; and a fixing hole near each of the two ends of the strip, namely one in its head and the other towards the opposite end, the head hole of one of the strips lying over the hole of the said opposite end of the other strip when these two strips are engaged by being superposed head to foot in the said rectangular opening in the core.

Thus the two connection strips machined to the required dimensions and drilled will be able to engage in the rectangular opening in the core, and this after the moulding stage of the mass of flexible material. Additionally, the setting of the two strips in the core comprises an extremely straightforward operation, and the strips are very easy to mass-produce, since they can all be identical.

To advantage and so as to facilitate the installation of the connection strips in the core, provision may also be made for the terminal part of each strip, on the opposite side to the head, to be slightly less wide than the body of the strip, i.e. slightly less than the length of the long side of the rectangular section of the opening in the core, this over a length slightly more than half the length of the said core.

In this way, when first inserted into the opening passing through the core, the two strips will be able to overlap with clearance before it is necessary to press them so as to force the body of the strips into this opening.

Also to advantage, on each strip the two fixing holes have slightly different diameters to allow for assembly tolerances.

Provision may also be made for the said core to comprise axially a bore constituting a central widening of the said rectangular opening, which will if need be enable the known assemblies described above with reference to FIGS. 1 and 2 to be obtained with the same core.

BRIEF DESCRIPTION OF THE DRAWINGS

One embodiment of the invention is described below as an entirely non-restrictive example with reference to the other figures of the appended drawing in which:

FIG. 6 is an end view of the inner armature core;

FIG. 7 is an axial sectional view of the core, along the line VII—VII in FIG. 6;

FIG. 8 is an elevation view of a connection strip; and

FIG. 9 is a outline view of this connection strip.

DETAILED DESCRIPTION OF THE PREFERRED EMBODIMENT

Figure 4:
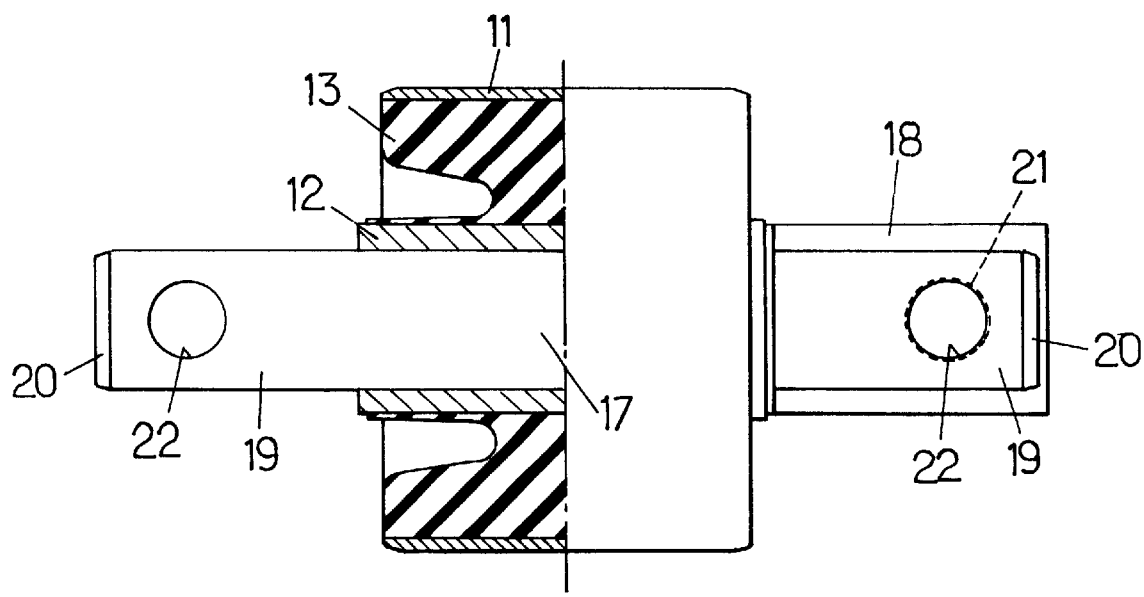
FIG. 4 shows a flexible joint in accordance with the invention, in an axial sectional half-view.
Figure 5:
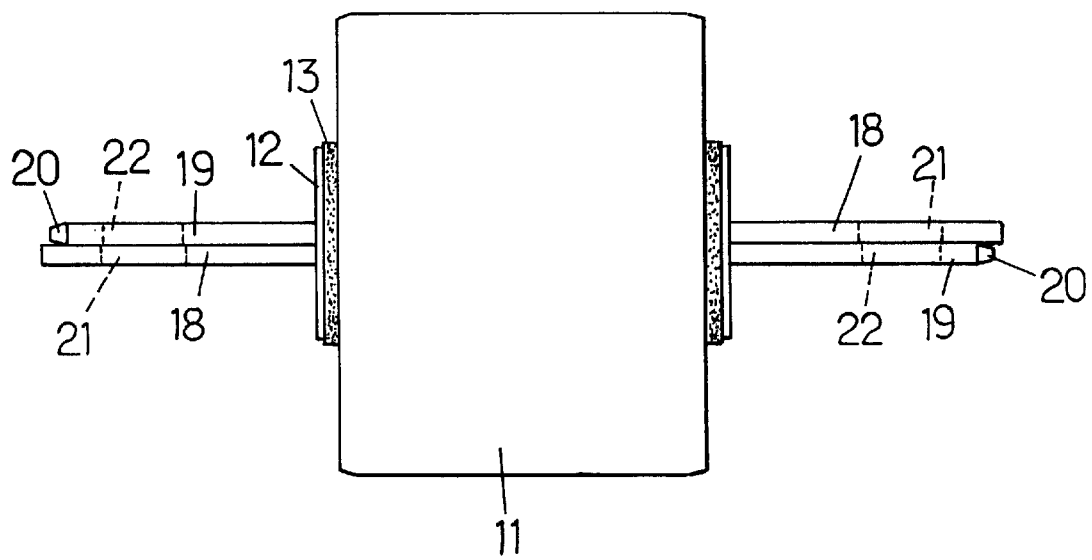
FIG. 5 shows the joint from above, which corresponds to the direction of the plane of the connection strips.

In FIGS. 4 and 5, as an example, a flexible joint has been shown which comprises a metal outer armature of generally cylindrical shape 11, and an inner armature core 12, which can also be of metal, between these two armatures being bonded a mass of flexible material in the shape of a sleeve 13, ensuring the resilience of the connection jointed between them. It will clearly be possible for this to be a sleeve of any shape, and may if need be include a damping system, for example with a hydraulic column.

The core 12 has the form of a thick tube in which a through, rectangular and narrow opening 14 has been provided, as well as a through bore 15 constituting a central widening of the opening 14 (FIGS. 6 and 7).

The connection strips, preferably identical, generally bear the reference 16 (FIGS. 8 and 9) and are made for example of cold rolled and cold hardened mild sheet steel. Each strip comprises a body 17 of constant width, able to engage with a tight fit in the rectangular opening 14 of the core 12, an approximately wider end head 18 and, at the opposite end, a terminal part 19 slightly less wide than the body 17, the difference in width being able to be, for example, of about ½ mm. The end of the terminal part 19 is chamfered at 20. The length of each terminal part 19 is slightly more than half the length of the core 12, for the reason indicated above. The strips 16 thus comprise, towards their ends, a fixing hole 21 in the head 18 and a fixing hole 22 in the terminal part 19 (FIG. 8). These holes can be of slightly different diameters, also for the reason indicated above, the difference being able to be here too about 0.5 mm.

Having available two strips thus constituted, it then remains only to engage them by their respective terminal parts 19 in the two opposite ends of the rectangular opening 14 of the core 12, these terminal parts being able to overlap with clearance in this opening due to their length, their abutment being avoided by means of the chamfered ends 20. Then they can be engaged completely and thoroughly until their heads 18 abut on the two opposite ends of the core 12 (FIGS. 4 and 5).

In this way the two connection strips 16 superposed head to foot in the inner armature core 12 can be fixed rapidly and reliably without clearance. The holes 21 and 22 of the two strips will be able subsequently to be used to provide, in a conventional way, fixing to the external part concerned, just as the outer armature 11 will also be connected by any conventional means to the other external part concerned, for example, by fitting.

Figure 1:
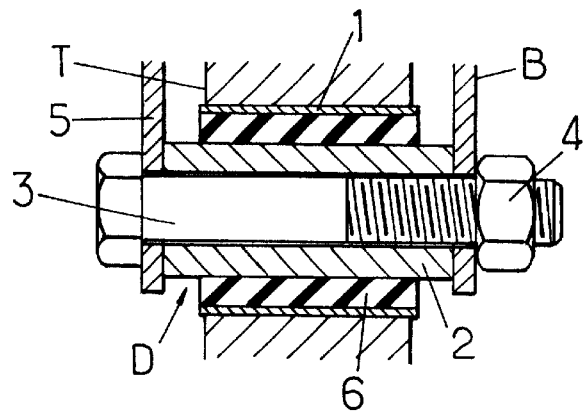
FIGS. 1–3 are elevational views, partly in sections, of prior devices.
Figure 2:
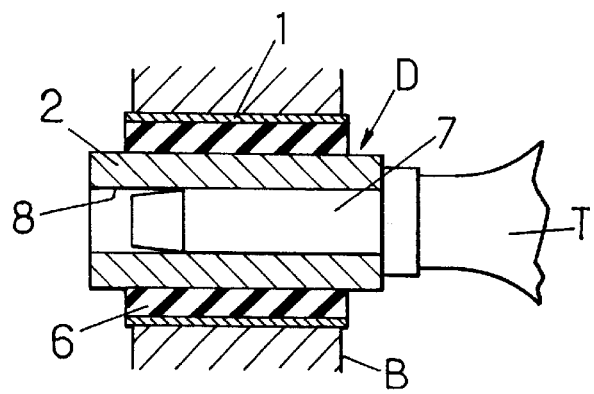
Figure 3:
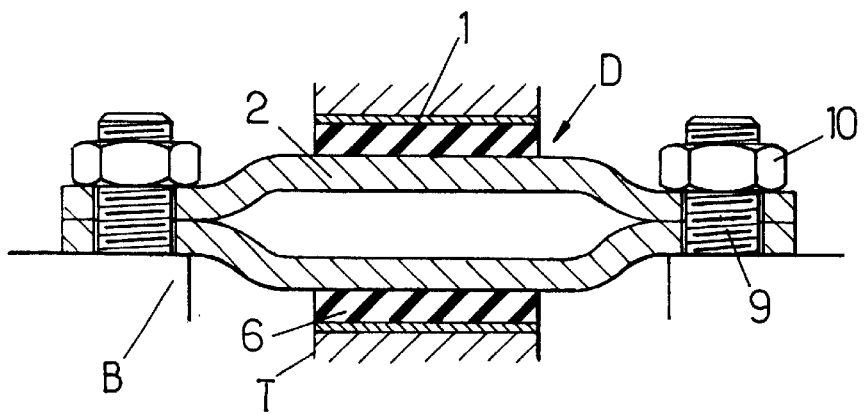

The bore 15 in the core will however be able to be used without the strips, to provide the connection of the core to the corresponding part by means of any conventional means such as bolt, spindle etc., as in FIGS. 1 and 2.

What is claimed is:

1. A mount assembly for elastically connecting an outer armature to an external part, the assembly comprising:

an inner armature core for a flexible joint, the inner armature core being adapted for connection to one of either the external part or the outer armature by a mass of flexible material, wherein the inner armature core includes a thick tube having a centrally located rectangular opening; and two elastic connection strips adapted for connection to a remaining one of the external part and outer armature not connected to the inner armature core, each strip having:

a body of constant width sized to closely fit inside a long side of the rectangular opening;

an end head wider than the body positioned to rest against a corresponding end of the inner armature core when the body is inserted into the rectangular opening, the strip having a terminal part located opposite the end head and protruding out an opposite end of the inner armature core;

a first fixing hole formed near the end head; and a second fixing hole formed near the terminal part;

wherein the first fixing hole of a first of the two strips overlies the second fixing hole of a second of the two strips when the two strips are engaged by being superposed head to foot in said rectangular opening of the inner armature core.

2. An assembly according to claim 1, wherein the two strips are identical.

3. An assembly according to claim 1, wherein the terminal part of each strip is slightly less wide than the body of the strip, and wherein the terminal part of each strip has a length slightly more than half a length of the inner armature core.

4. An assembly according to claim 1, wherein the first and second fixing holes of each strip have slightly different diameters to allow for assembly tolerances.

5. An assembly according to claim 1, wherein the inner armature core comprises axially a bore forming a central widening of said rectangular opening.

* * * * *